United States Patent [19]

Logan et al.

[11] Patent Number: 5,134,593
[45] Date of Patent: Jul. 28, 1992

[54] GEOPHONE SPRING

[75] Inventors: Roger M. Logan; James A. Sackett, both of Houston, Tex.

[73] Assignee: Western Atlas International Inc., Houston, Tex.

[21] Appl. No.: 701,747

[22] Filed: May 17, 1991

[51] Int. Cl.$^5$ .............................. H04R 9/00
[52] U.S. Cl. ............................ 367/187; 367/183; 267/141.3
[58] Field of Search ................ 367/181-187; 267/140.1-141.7

[56] References Cited

U.S. PATENT DOCUMENTS

| | | | |
|---|---|---|---|
| 2,311,416 | 2/1943 | Salb et al. | 367/183 |
| 2,348,225 | 5/1944 | Petty | 367/183 |
| 2,748,370 | 5/1956 | Baltosser | 367/183 |
| 3,577,184 | 5/1971 | McNeel | 367/183 |
| 3,738,445 | 6/1973 | Wilson et al. | 367/183 |
| 4,238,845 | 12/1980 | Haggard et al. | 367/183 |
| 4,323,994 | 4/1982 | Cougler | 367/183 |
| 4,458,344 | 7/1984 | Coogler | 367/183 |
| 4,623,991 | 11/1986 | Vitringa | 367/187 X |
| 4,685,094 | 8/1987 | Vitringa | 367/183 |

*Primary Examiner*—Brian S. Steinberger
*Attorney, Agent, or Firm*—E. Eugene Thigpen

[57] ABSTRACT

A spring for a seismometer for suspending one body relative to a fixed reference point within a housing including an outer ring and an inner ring interconnected by a plurality of arcuate legs. Each leg has an inner and an outer edge which may be defined by a plurality of arcs of different radii and distinct centers. The plurality of arcs further divide each leg into an inner section and an outer section of approximately equal length, and a middle section of substantially constant width and thickness. The spring provides an improved spurious resonance over the prior art springs as well as having an improved useful life.

3 Claims, 4 Drawing Sheets

GEOPHONE SPRING

BACKGROUND OF THE INVENTION

1. Field of the Invention

This invention relates to transducers used in seismic exploration and more particularly to springs used in such transducers for suspending an inertial mass within a magnetic field.

2. Discussion of the Related Art

Geophones typically used in seismic exploration include a spring for suspending an inertial mass in a supporting frame, and a means for measuring the relative motion between the inertial mass and the frame. Typically the inertial mass is a wire-wound coil form suspended by springs in a magnetic field, one spring being attached to each end of the coil. The springs centrally position the coil form within the magnetic field both laterally and vertically along the geophone's axis. The springs and mass of the coil affect the resonant or natural frequency of the system.

Several conventional geophones use springs having an outer ring and an inner ring interconnected by a plurality of legs. Commonly, many such springs are formed by etching or stamping the spring from sheets of spring material such as beryllium copper. Historically, a wide variety of geophone springs have been consider implemented, ranging from those having as many as nine legs to those having as few as three legs. Other springs utilize a cantilevered construction having concentric rings or adjacent arcuate legs similar to modern geophones. Still others employ a combined arcuate- and straight-segmented leg construction. Each of the above springs are disclosed in U.S. Pat. No. 2,348,225 (six arcuate legs); 2,751,573 (straight leg); 3,020,767 (straight leg); 3,602,490 (concentric cantilevered legs); 3,738,445 (adjacent arcuate and cantilevered legs); 3,890,606 (overlapping arcuate legs); 4,152,692 (concentric arcuate legs); 4,238,845 (compound arcuate legs); 4,323,994 (straight-segmented legs); 4,458,344 (tapered, straight-segmented legs); and 4,623,991 (delta shaped spring).

The legs of geophone springs generally have a rectangular cross-section and are curved or bent at specific locations in order to join the inner and outer portions of the spring. After etching or stamping, the spring is preformed according to known techniques to offset the inner portion or annulus from the plane of the outer annulus. When the inertial mass is suspended between two such springs, the inner ring, legs, and outer ring of each spring lie in the same plane.

A geophone is intended to detect motion in a direction roughly parallel to the axis of the coil form within the geophone housing. Therefore, the effects of any lateral motion of the coil form in response to forces perpendicular to the axis of the suspended coil are undesirable and should be eliminated or minimized. Such is a common occurrence in the handling of the geophones during a seismic survey.

Seismic signals which arrive substantially parallel to the axis of the geophone cause the geophone to generate a primary signal or response. Seismic signals which arrive substantially perpendicular (cross-axial) to the axis of the geophone cause the geophone to generate a spurious response. The spurious resonance is normally defined as the first major amplitude peak on the frequency spectrum of the spurious response which is broadband. It is desired that the spurious resonance be as high as possible so as not to be confused with signals arriving substantially parallel to the axis of the geophone.

There are two contributing factors to the spurious response, with relative levels dependent on the individual design of a particular model of geophone. One component of the spurious response is due to a complex transformation of forces within the spring which result in an axial movement of the coil, causing the coil to pass through radially directed lines of magnetic flux. The other component of spurious response is due to a cross-axial movement of the coil through the lines of magnetic flux which are not purely radially directed.

In modern geophysical prospecting, frequencies greater than 100 hertz (Hz) are of increasing interest to the geoscientist. However, conventional geophones may not be used to detect signals at such frequencies because of inherently low spurious resonances. It has been found that the spurious resonance of the geophone can be raised and lowered by changing the geometry of the geophone springs. One method for raising the spurious resonance of the geophone is to decrease the length of the legs connecting the inner and outer annuli. Unfortunately, this method can decrease the linearity of the spring to the extent its response becomes distorted. Unfortunately, the signal distortion, caused by a spring's nonlinear behavior, is increased when the legs are relatively short. Attempts to achieve the optimum leg ratio to provide high spurious resonance and yet maintain lateral stiffness are disclosed in U.S. Pat. Nos. 4,323,994, 4,458,344, and 4,623,991.

Accordingly, it is an object of the present invention to provide a geophone spring having a spurious resonance above the frequency of interest in seismic surveys. It is another object of the present invention to provide a geophone spring having improved lateral stiffness while providing the desired linear behavior and increased spring life.

SUMMARY OF THE INVENTION

In accordance with the objects of this invention, one embodiment of the geophone spring has an outer member, an inner member, and a plurality of legs interconnecting the inner member and the outer member. Each leg is comprised of three segments; an inner portion extending out from the inner member, a middle portion, and outer portion extending in from the outer member. The inner edge of each of the segments is defined by a unique arc having points of origin on the inner member of the spring. The definition of the inner edge of each leg in this manner results in a tapering of the inner and outer portions of each leg towards the middle portion which is of constant width. Such a construction produces a geophone leg having a linear vertical spring rate for ease of manufacture with low mechanical contributions to total harmonic distortion of the output signal. An additional benefit of the spring is that it has a high horizontal spring rate to avoid low horizontal resonances. A further benefit is an almost uniform stress distribution within each spring arm, with few concentrations which cause fatigue which in turn lowers the vertical spring rate.

BRIEF DESCRIPTION OF THE DRAWING FIGURES

A better understanding of the benefits and advantages of our invention may be obtained from the appended detailed description and drawing figures, wherein.

Figure 4:
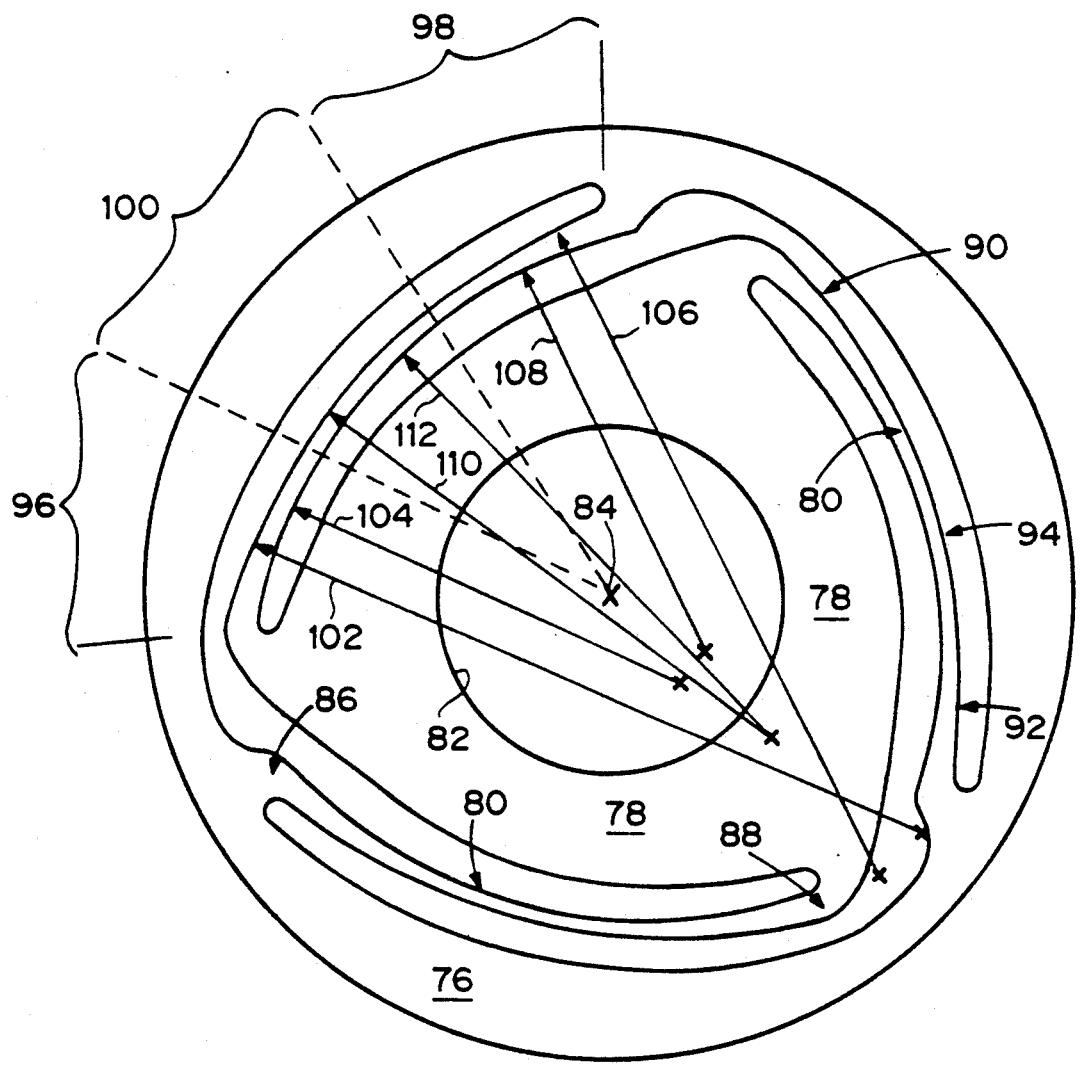
Figure 5A:
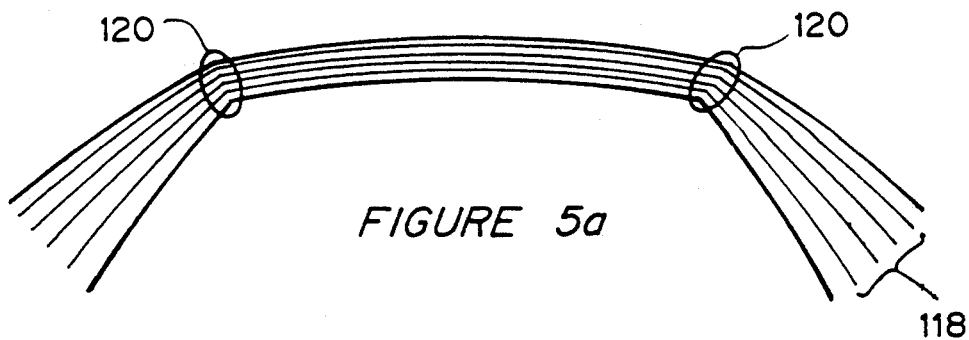
Figure 5B:
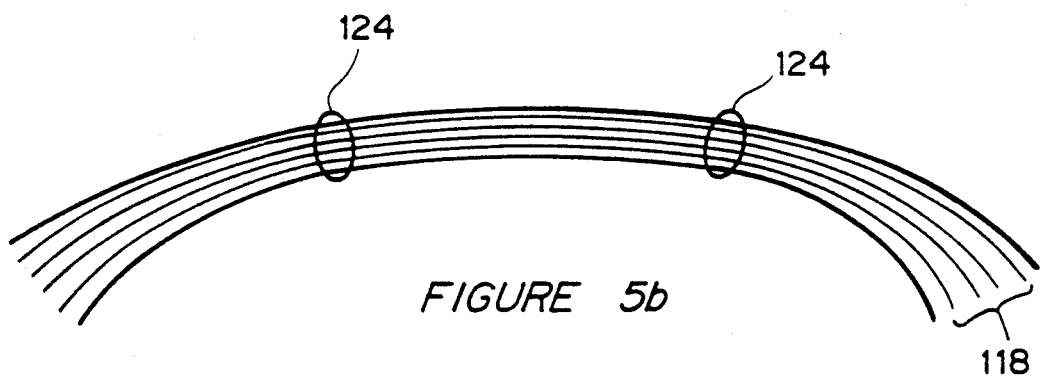

FIG. 4 provides a plan view of one geophone spring contemplated in the instant invention; and FIGS. 5a and 5b are representations of lines of stress present in different configurations of a spring leg.

DETAILED DESCRIPTION OF PREFERRED EMBODIMENTS

Figure 1:
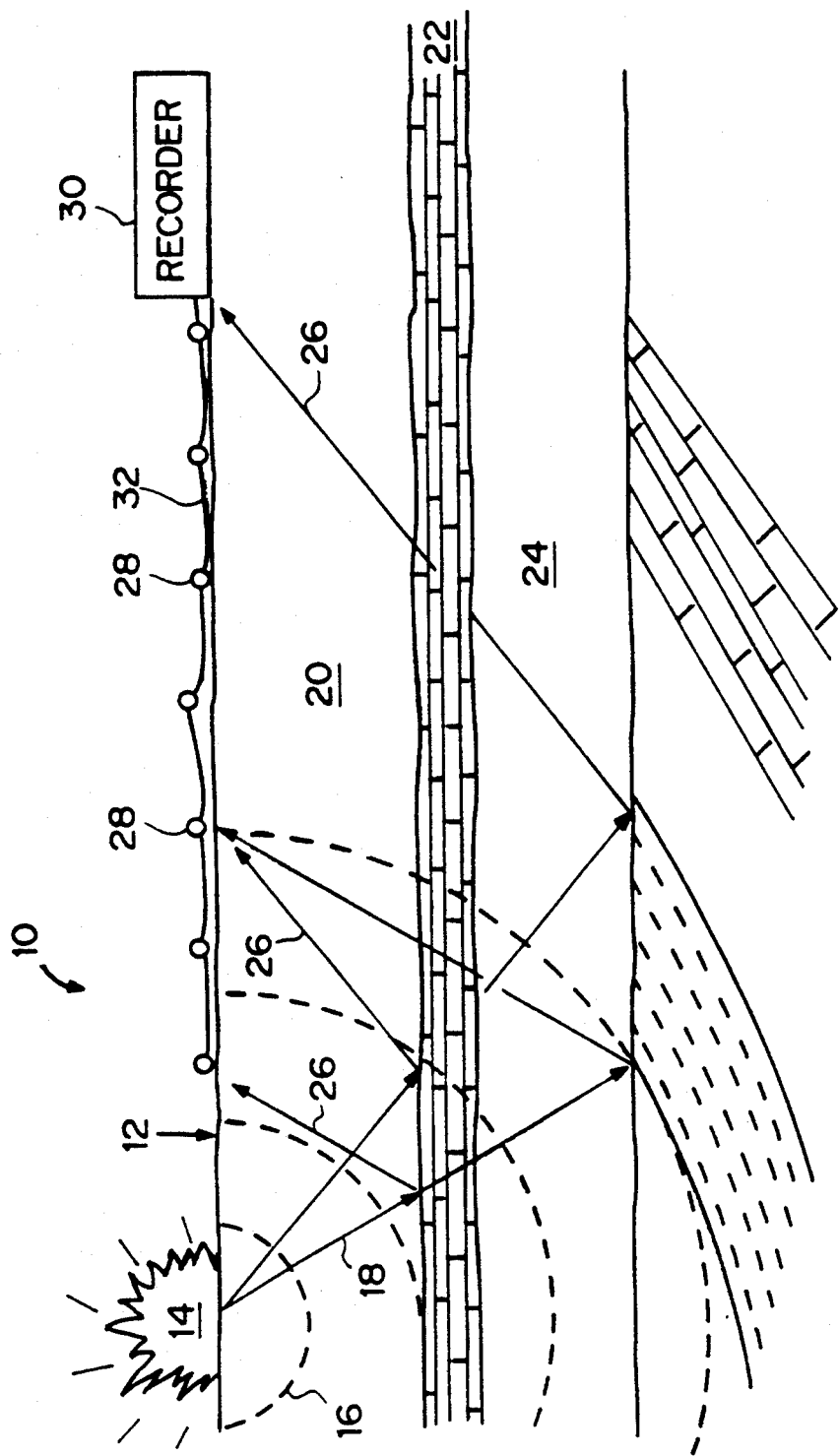
FIG. 1 is a general illustration of a seismic survey along the surface of the earth.

FIG. 1 is a general illustration of a seismic survey 10 along the surface of the earth 12. A source of seismic energy 14 located at a predetermined location along the surface of the earth 12 is actuated to induce a seismic signal 16 in the earth. The signal 16 propagates downward as a spherical wavefront away from the source and into the subsurface, the direction of which is generally indicated by arrows 18. As the wavefront propagates through the subsurface layers 20-24, a portion of the energy, represented by arrows 26, is reflected back toward the surface by acoustic impedance changes between intervals 20-24. The reflected signals are detected by one or more seismic sensors 28 located on the surface 12. As each of the sensors detects the arriving signal, each generates another signal which is sent to a remote recording unit 30 for storage and subsequent analysis. Telemetering of the signal from the sensors to the remote recording unit may be through any standard means, such as a conductive cable 32, or by RF signal.

Figure 2:
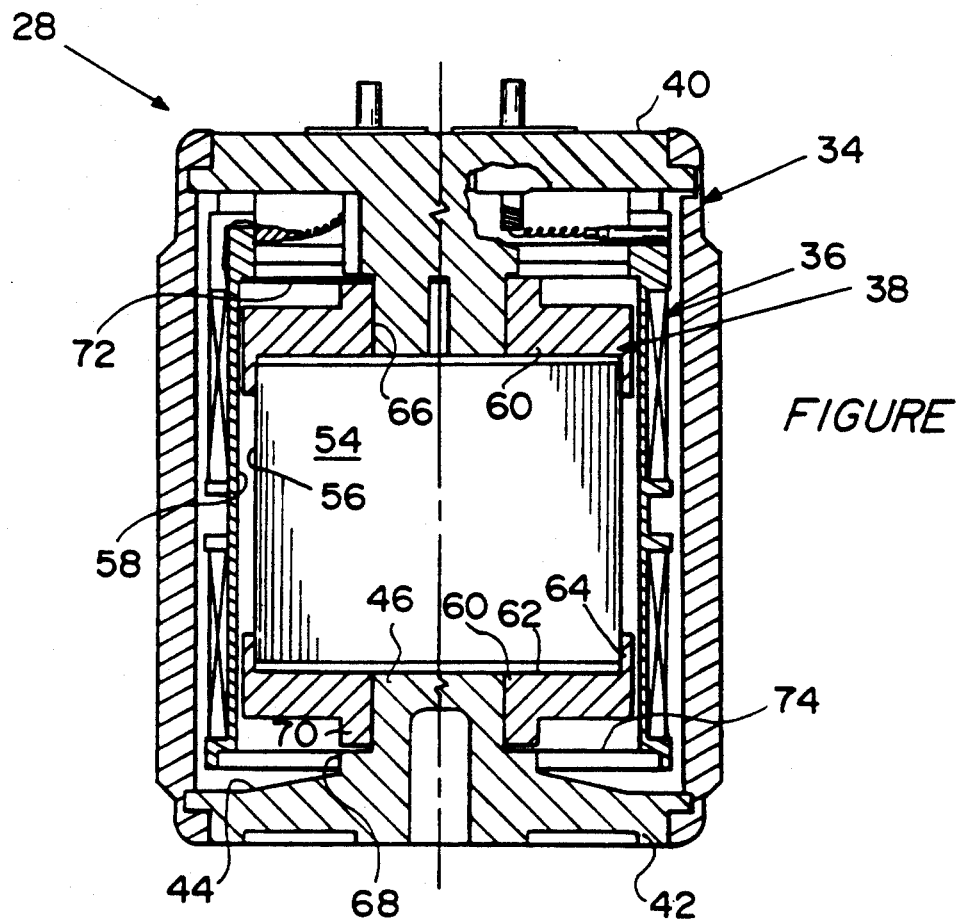
FIG. 2 is a cross-sectional elevation view of a geophone.

FIG. 2 is a cross-section elevation view of one geophone that may be used in FIG. 1. The geophone 28 has essentially three major assemblies which may be characterized as the housing or casing 34, a coil/moving mass assembly, generally indicated by reference 36, and a magnetic assembly, generally shown by reference 38. Each of the assemblies are especially adapted to provide maximum performance and durability for use in the rugged environments often encountered in seismic exploration.

The housing or outer case 34 may be cylindrical and open at each end. The case may be formed from rugged, high relative permeability, ferromagnetic materials such as steel. The ends of the case may be closed by end pieces 40 and 42 made from a nonmagnetic material. Each end piece may serve as an integral function in the internal construction of the transducer. In the Figure, the inner surface 44 of each piece may be conical, terminating in a cylindrical post 46 used to retain inner assemblies described in greater detail below.

Figure 3:
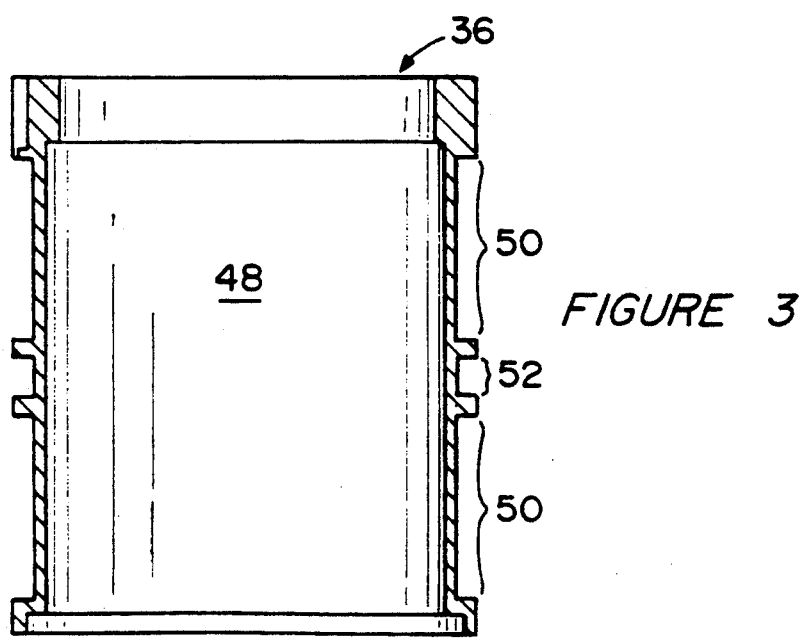
FIG. 3 is an elevational view of an inertial mass used in the geophone of FIG. 2.

The coil and mass assembly, also called a coil form 36, is axially disposed within the casing 34 and aligned such that a minimum clearance exists between the inner well of the casing and the coil form. As seen in FIG. 3, the coil form may be described as a tubular right circular cylinder 48. The exterior surface of the cylinder 48 may contain annular grooves 50 proximate to each end of the coil form and designed to receive a spool of conductive wire (not shown). Each spool of wire is wrapped about the coil form 36 and within the lateral annular grooves 50. One or more central annular flanges 52 between lateral grooves 50 separates each wire spool to properly locate it within the field of magnetic flux produced by the magnetic assembly 38.

The magnetic assembly 38 includes a permanent magnet 54 which is centrally disposed within the tubular coil form 36. The magnet is preferably in the form of a right circular cylinder so as to conform with the interior surface of the coil form and conserve space. The exterior surface 56 of the magnet is spaced from the inner surface 58 of the coil form so as to permit free vertical movement of the coil form with respect to the magnet.

The magnet is constrained between caps 60, each of which retains the magnet in a circular recess or pot 62 defined by a lip 64. Each cap is made from a ferromagnetic material to shape the magnetic field. Each cap 60 may have an axial bore or hole 66 for receiving the posts 46 extending inward from the end pieces 40 and 42 sealing the case. In a preferred embodiment each of the caps 60 are identical in shape. However, different configurations of the caps may be adapted depending upon the design of the geophone. In the Figure, an axial bore 66 passes through the cap 60 so the posts 46 of the end pieces 40 or 42 engage the magnet 54. In this configuration, a space is provided between a shoulder 68 of the post 46 and a shoulder 70 of the cap.

The coil form 36 is suspended within the casing along the perimeter of a pair of springs 72 and 74. Each spring may be characterized as having an outer annulus 76, an inner annulus 78, and a plurality of arcuate legs 80 equidistantly spaced from each other and interconnecting the outer annulus with the inner annulus. The center of the spring may have a hole 82 to accept the posts 46. The spring resides within the space provided between the shoulders 68 and 70 as described above. A better illustration of the springs 72 and 74 may be made by referring to FIG. 4.

FIG. 4 provides a plan view of the geophone spring contemplated in the instant invention. As briefly described above, each spring 72 and 74 has an outer member or annulus 76, an inner member or annulus 78, and a plurality of arcuate legs 80 interconnecting the outer annulus with the inner annulus. Such springs may be on the order of an inch or less in diameter. The Figure illustrates three such legs, although two or more legs may be used.

The legs are disposed equidistantly from each other and are identical in shape and form. Each leg 80 is generally curved about the center 84 of the spring, extending from an outer root or juncture point 86 on the outer member 76 to an inner root or juncture point 88 on the inner member 78. Each leg may be further described as having three general regions: an inner tapered section 90, an outer tapered section 92, each joined by a constant width middle section 94. Each section may constitute approximately one-third the length of the leg although the length of the middle section may vary as long as the inner and outer tapered sections are of equal length.

As seen in the Figure, one of the legs has been divided into three sections 96, 98, and 100. The inner tapered section 96 is defined by two arcs: one for the outer edge 102 and one for the inner edge 104. For example the arc defining the inner edge 104 of the inner tapered section 90 may, for the purposes of illustration only, have a radius dimension of 0.201 inch with the center of the arc located 0.0525 inch from the center of the spring along the 142.87 degree radial. Examples of arcs defining the remaining edges for the spring legs are given in Table 1.

TABLE 1

| ARC | RADIUS | Arc Location CENTER RADIUS | ANGLE (Degrees) |
| --- | --- | --- | --- |
| 102 | .3390 | .1813 | 137.33 |
| 104 | .2010 | .0525 | 123.25 |
| 106 | .3390 | .1813 | 137.33 |
| 108 | .2010 | .0525 | 123.25 |
| 110 | .2514 | .1014 | 132.77 |
| 112 | .2290 | .1014 | 132.77 |

Figure 5C:
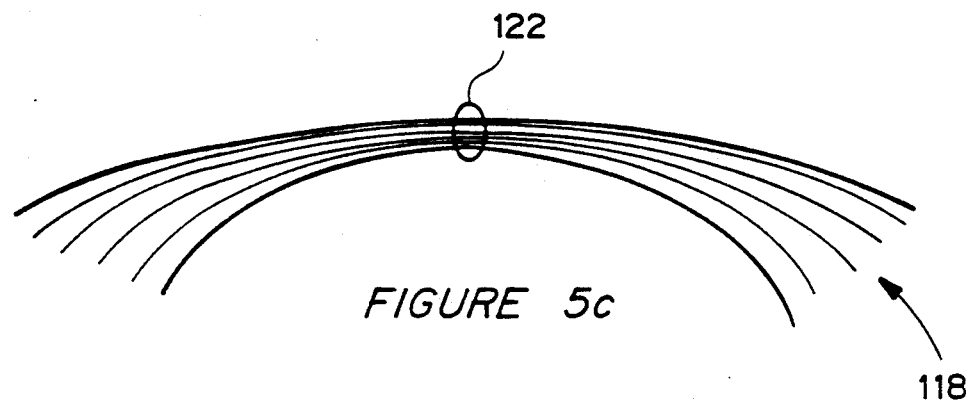

From the table, it is readily apparent that each leg is not defined by a single arc, but rather by several arcs, the center of each arc being dissimilar from the center of the spring. This unique aspect of compound-arc construction provides improved performance and longevity over prior art springs. A primary reason for the improved performance is demonstrated by FIG. 5. FIGS. 5a–c represent lines of equal stress 118 that may be present in three different configurations of a spring leg.

Mechanical fatigue will occur in an improperly designed geophone spring when the geophone is subjected to lateral shocks. Either a loss of tensile strength or a mechanical break may occur at any point in the spring arm which has a stress anomaly as shown in FIGS. 5a and 5c. Such anomalies exist where lines of equal stress bend sharply such as indicated at points 120 or where a stress density maximum occurs over a short distance such as indicated by numeral 122. It is desired that such conditions be eliminated or at least limited as much as possible without limiting certain other desired characteristics.

In the present embodiment of the spring, the lines of equal stress seen in FIG. 5b make smooth transitions from one section of the spring to another. These lines are mainly governed by the geometry of the inner and outer fibers and each can be described mathematically as being made up of three discrete arcs which share a common tangent at the point where they meet. The width of this leg is at a uniform minimum over the entire length of the middle section. This translates to a uniform maximum stress density spread over a large portion of the leg.

Once the spring has been produced, the spring is preformed by displacing the inner annulus with respect to the outer annulus, yet the inner annulus remains concentric with the outer annulus. Each of the legs in the spring then form a curved beam from the inner member to the outer member. Two springs having the above configuration are placed within the geophone to suspend the coil form as described above.

Our invention has been described with a certain degree of specificity. Variations will occur to those skilled in the art which are within the scope and spirit of this invention which is limited only by the appended claims, wherein:

We claim as our invention:

1. A spring, for use in a motion sensor, for suspending an inertial mass at a predetermined position within a fixed support structure, comprising:
   (a) an outer annulus;
   (b) an inner annulus concentric with the outer annulus;
   (c) a plurality of arcuate legs radially disposed around the center of the spring at substantially equal distances from each other and interconnecting the outer annulus with the inner annulus, wherein each leg has an inner edge defined by a first set of outside, middle and inside arcs having dissimilar centers and an outer edge defined by a second set of outside, middle and inside arcs with dissimilar centers, the two middle arcs defining a middle section of constant width which equally disperses torsional stress along the constant width length to reduce mechanical sagging of the suspended mass thereon, and the outside and inside arc pairs defining outside and inside sections that taper outwardly from their respective junctions with the constant-width center section to their respective connections with the outer and inner annuli.

2. The spring of claim 1, wherein the length of the middle section is at least three times the length of the outside and inside sections.

3. The spring of claim 1, wherein the length of the outside and inside sections are of equal lengths and are each at least one-fifth the length of the leg.

* * * * *